US008736617B2

(12) United States Patent
Lew et al.

(10) Patent No.: US 8,736,617 B2
(45) Date of Patent: May 27, 2014

(54) HYBRID GRAPHIC DISPLAY

(75) Inventors: Stephen Lew, Sunnyvale, CA (US);
Bruce R. Intihar, Sunnyvale, CA (US);
Abraham B. de Waal, San Jose, CA (US); David G. Reed, Saratoga, CA (US); Tony Tamasi, Los Gatos, CA (US); David Wyatt, San Jose, CA (US); Franck R. Diard, Mountain View, CA (US); Brad Simeral, San Francisco, CA (US)

(73) Assignee: Nvidia Corporation, Santa Clara, CA (US)

( * ) Notice: Subject to any disclaimer, the term of this patent is extended or adjusted under 35 U.S.C. 154(b) by 686 days.

(21) Appl. No.: 12/185,698

(22) Filed: Aug. 4, 2008

(65) Prior Publication Data
US 2010/0026692 A1 Feb. 4, 2010

(51) Int. Cl.
G06F 15/16 (2006.01)
G06F 15/80 (2006.01)

(52) U.S. Cl.
USPC ............ 345/502; 345/503; 345/504; 345/505

(58) Field of Classification Search
USPC ........................................ 345/501–506, 555
See application file for complete search history.

(56) References Cited

U.S. PATENT DOCUMENTS

| | | |
|---|---|---|
| 4,603,400 A | 7/1986 | Daniels |
| 4,955,066 A | 9/1990 | Notenboom |
| 5,016,001 A | 5/1991 | Minagawa et al. |
| 5,321,510 A | 6/1994 | Childers et al. |
| 5,371,847 A | 12/1994 | Hargrove |
| 5,461,679 A | 10/1995 | Normile et al. |
| 5,517,612 A | 5/1996 | Dwin et al. |
| 5,572,649 A | 11/1996 | Elliott et al. |
| 5,687,334 A | 11/1997 | Davis et al. |
| 5,712,995 A | 1/1998 | Cohn |
| 5,768,164 A | 6/1998 | Hollon, Jr. |
| 5,781,199 A | 7/1998 | Oniki et al. |
| 5,841,435 A | 11/1998 | Dauerer et al. |
| 5,878,264 A | 3/1999 | Ebrahim |
| 5,900,913 A | 5/1999 | Tults |
| 5,917,502 A | 6/1999 | Kirkland et al. |
| 5,923,307 A | 7/1999 | Hogle, IV |
| 5,953,532 A | 9/1999 | Lochbaum |
| 5,978,042 A | 11/1999 | Vaske et al. |
| 6,008,809 A | 12/1999 | Brooks |
| 6,018,340 A | 1/2000 | Butler et al. |
| 6,025,841 A | 2/2000 | Finkelstein et al. |
| 6,025,853 A | 2/2000 | Baldwin |
| 6,075,531 A | 6/2000 | DeStefano |

(Continued)

FOREIGN PATENT DOCUMENTS

WO 2005026918 3/2005

OTHER PUBLICATIONS

"System Management Bus (SMBus) Specification," Version 2.0, Aug. 3, 2000; pp. 1-59.

(Continued)

*Primary Examiner* — Hau Nguyen

(57) ABSTRACT

A method of displaying graphics data is described. The method involves accessing the graphics data in a memory subsystem associated with one graphics subsystem. The graphics data is transmitted to a second graphics subsystem, where it is displayed on a monitor coupled to the second graphics subsystem.

20 Claims, 8 Drawing Sheets

(56) References Cited

U.S. PATENT DOCUMENTS

| | | | |
|---|---|---|---|
| 6,078,339 A | 6/2000 | Meinerth et al. | |
| 6,191,758 B1 | 2/2001 | Lee | |
| 6,208,273 B1 | 3/2001 | Dye et al. | |
| 6,226,237 B1 | 5/2001 | Chan et al. | |
| 6,259,460 B1 | 7/2001 | Gossett et al. | |
| 6,337,747 B1 | 1/2002 | Rosenthal | |
| 6,359,624 B1 | 3/2002 | Kunimatsu | |
| 6,388,671 B1 | 5/2002 | Yoshizawa et al. | |
| 6,407,752 B1 | 6/2002 | Harnett | |
| 6,473,086 B1 | 10/2002 | Morein et al. | |
| 6,480,198 B2 | 11/2002 | Kang | |
| 6,483,502 B2 | 11/2002 | Fujiwara | |
| 6,483,515 B1 | 11/2002 | Hanko | |
| 6,498,721 B1 | 12/2002 | Kim | |
| 6,557,065 B1 | 4/2003 | Peleg et al. | |
| 6,600,500 B1 | 7/2003 | Yamamoto | |
| 6,628,243 B1 | 9/2003 | Lyons et al. | |
| 6,628,309 B1 | 9/2003 | Dodson et al. | |
| 6,630,943 B1 | 10/2003 | Nason et al. | |
| 6,654,826 B1 | 11/2003 | Cho et al. | |
| 6,657,632 B2 | 12/2003 | Emmot et al. | |
| 6,724,403 B1 | 4/2004 | Santoro et al. | |
| 6,753,878 B1 | 6/2004 | Heirich et al. | |
| 6,774,912 B1 | 8/2004 | Ahmed et al. | |
| 6,784,855 B2 | 8/2004 | Matthews et al. | |
| 6,816,977 B2 | 11/2004 | Brakmo et al. | |
| 6,832,269 B2 | 12/2004 | Huang et al. | |
| 6,832,355 B1 | 12/2004 | Duperrouzel et al. | |
| 6,871,348 B1 | 3/2005 | Cooper | |
| 6,956,542 B2 | 10/2005 | Okuley et al. | |
| 7,007,070 B1 | 2/2006 | Hickman | |
| 7,010,755 B2 | 3/2006 | Anderson et al. | |
| 7,030,837 B1 | 4/2006 | Vong et al. | |
| 7,034,776 B1 | 4/2006 | Love | |
| 7,036,089 B2 | 4/2006 | Bauer | |
| 7,103,850 B1 | 9/2006 | Engstrom et al. | |
| 7,124,360 B1 | 10/2006 | Drenttel et al. | |
| 7,127,745 B1 | 10/2006 | Herse et al. | |
| 7,129,909 B1 | 10/2006 | Dong et al. | |
| 7,149,982 B1 | 12/2006 | Duperrouzel et al. | |
| 7,212,174 B2 | 5/2007 | Johnston et al. | |
| 7,269,797 B1 | 9/2007 | Bertocci et al. | |
| 7,359,998 B2 | 4/2008 | Chan et al. | |
| 7,486,279 B2 | 2/2009 | Wong et al. | |
| 7,509,444 B2 | 3/2009 | Chiu et al. | |
| 7,546,546 B2 | 6/2009 | Lewis-Bowen et al. | |
| 7,552,391 B2 | 6/2009 | Evans et al. | |
| 7,558,884 B2 | 7/2009 | Fuller et al. | |
| 7,590,713 B2 | 9/2009 | Brockway et al. | |
| 7,612,783 B2 * | 11/2009 | Koduri et al. | 345/611 |
| 7,783,985 B2 | 8/2010 | Indiran et al. | |
| 8,176,155 B2 | 5/2012 | Yang et al. | |
| 8,190,707 B2 | 5/2012 | Trivedi et al. | |
| 2001/0028366 A1 | 10/2001 | Ohki et al. | |
| 2002/0054141 A1 | 5/2002 | Yen et al. | |
| 2002/0057295 A1 | 5/2002 | Panasyuk et al. | |
| 2002/0087225 A1 | 7/2002 | Howard | |
| 2002/0128288 A1 | 9/2002 | Kyle et al. | |
| 2002/0129288 A1 | 9/2002 | Loh et al. | |
| 2002/0140627 A1 | 10/2002 | Ohki et al. | |
| 2002/0163513 A1 | 11/2002 | Tsuji | |
| 2002/0175933 A1 | 11/2002 | Ronkainen et al. | |
| 2002/0182980 A1 | 12/2002 | Van Rompay | |
| 2002/0186257 A1 | 12/2002 | Cadiz et al. | |
| 2002/0196279 A1 | 12/2002 | Bloomfield et al. | |
| 2003/0016205 A1 | 1/2003 | Kawabata et al. | |
| 2003/0025689 A1 | 2/2003 | Kim | |
| 2003/0041206 A1 | 2/2003 | Dickie | |
| 2003/0065934 A1 | 4/2003 | Angelo et al. | |
| 2003/0088800 A1 | 5/2003 | Cai | |
| 2003/0090508 A1 | 5/2003 | Keohane et al. | |
| 2003/0105812 A1 | 6/2003 | Flowers, Jr. et al. | |
| 2003/0126335 A1 | 7/2003 | Silvester | |
| 2003/0160816 A1 | 8/2003 | Zoller et al. | |
| 2003/0177172 A1 | 9/2003 | Duursma et al. | |
| 2003/0179240 A1 | 9/2003 | Gest | |
| 2003/0179244 A1 | 9/2003 | Erlingsson | |
| 2003/0188144 A1 | 10/2003 | Du et al. | |
| 2003/0189597 A1 | 10/2003 | Anderson et al. | |
| 2003/0195950 A1 | 10/2003 | Huang et al. | |
| 2003/0197739 A1 | 10/2003 | Bauer | |
| 2003/0200435 A1 | 10/2003 | England et al. | |
| 2003/0208529 A1 | 11/2003 | Pendyala et al. | |
| 2003/0222876 A1 | 12/2003 | Giemborek et al. | |
| 2003/0222915 A1 | 12/2003 | Marion et al. | |
| 2003/0225872 A1 | 12/2003 | Bartek et al. | |
| 2003/0229900 A1 | 12/2003 | Reisman | |
| 2004/0001069 A1 | 1/2004 | Snyder et al. | |
| 2004/0019724 A1 | 1/2004 | Singleton, Jr. et al. | |
| 2004/0027315 A1 | 2/2004 | Senda et al. | |
| 2004/0066414 A1 | 4/2004 | Czerwinski et al. | |
| 2004/0070608 A1 | 4/2004 | Saka | |
| 2004/0080482 A1 | 4/2004 | Magendanz et al. | |
| 2004/0085328 A1 | 5/2004 | Maruyama et al. | |
| 2004/0095382 A1 | 5/2004 | Fisher et al. | |
| 2004/0145605 A1 | 7/2004 | Basu et al. | |
| 2004/0153493 A1 | 8/2004 | Slavin et al. | |
| 2004/0184523 A1 | 9/2004 | Dawson et al. | |
| 2004/0222978 A1 | 11/2004 | Bear et al. | |
| 2004/0224638 A1 | 11/2004 | Fadell et al. | |
| 2004/0225901 A1 | 11/2004 | Bear et al. | |
| 2004/0225907 A1 | 11/2004 | Jain et al. | |
| 2004/0235532 A1 | 11/2004 | Matthews et al. | |
| 2004/0260565 A1 | 12/2004 | Zimniewicz et al. | |
| 2004/0268004 A1 | 12/2004 | Oakley | |
| 2005/0025071 A1 | 2/2005 | Miyake et al. | |
| 2005/0059346 A1 | 3/2005 | Gupta et al. | |
| 2005/0064911 A1 | 3/2005 | Chen et al. | |
| 2005/0066209 A1 | 3/2005 | Kee et al. | |
| 2005/0073515 A1 | 4/2005 | Kee et al. | |
| 2005/0076088 A1 | 4/2005 | Kee et al. | |
| 2005/0076256 A1 | 4/2005 | Fleck et al. | |
| 2005/0091610 A1 | 4/2005 | Frei et al. | |
| 2005/0097506 A1 | 5/2005 | Heumesser | |
| 2005/0125739 A1 | 6/2005 | Thompson et al. | |
| 2005/0132299 A1 | 6/2005 | Jones et al. | |
| 2005/0140566 A1 | 6/2005 | Kim et al. | |
| 2005/0182980 A1 | 8/2005 | Sutardja | |
| 2005/0240538 A1 | 10/2005 | Ranganathan | |
| 2005/0240873 A1 | 10/2005 | Czerwinski et al. | |
| 2005/0262302 A1 | 11/2005 | Fuller et al. | |
| 2005/0268246 A1 | 12/2005 | Keohane et al. | |
| 2006/0001595 A1 | 1/2006 | Aoki | |
| 2006/0007051 A1 | 1/2006 | Bear et al. | |
| 2006/0085760 A1 | 4/2006 | Anderson et al. | |
| 2006/0095617 A1 | 5/2006 | Hung | |
| 2006/0119537 A1 | 6/2006 | Vong et al. | |
| 2006/0119538 A1 | 6/2006 | Vong et al. | |
| 2006/0119602 A1 | 6/2006 | Fisher et al. | |
| 2006/0125784 A1 | 6/2006 | Jang et al. | |
| 2006/0129855 A1 | 6/2006 | Rhoten et al. | |
| 2006/0130075 A1 | 6/2006 | Rhoten et al. | |
| 2006/0142878 A1 | 6/2006 | Banik et al. | |
| 2006/0150230 A1 | 7/2006 | Chung et al. | |
| 2006/0164324 A1 | 7/2006 | Polivy et al. | |
| 2006/0232494 A1 | 10/2006 | Lund et al. | |
| 2006/0250320 A1 | 11/2006 | Fuller et al. | |
| 2006/0267857 A1 | 11/2006 | Zhang et al. | |
| 2006/0267987 A1 * | 11/2006 | Litchmanov | 345/502 |
| 2006/0267992 A1 * | 11/2006 | Kelley et al. | 345/502 |
| 2006/0282855 A1 | 12/2006 | Margulis | |
| 2007/0046562 A1 | 3/2007 | Polivy et al. | |
| 2007/0050727 A1 | 3/2007 | Lewis-Bowen et al. | |
| 2007/0052615 A1 | 3/2007 | Van Dongen et al. | |
| 2007/0067655 A1 | 3/2007 | Shuster | |
| 2007/0079030 A1 | 4/2007 | Okuley et al. | |
| 2007/0083785 A1 | 4/2007 | Sutardja | |
| 2007/0103383 A1 | 5/2007 | Sposato et al. | |
| 2007/0195007 A1 | 8/2007 | Bear et al. | |
| 2007/0273699 A1 * | 11/2007 | Sasaki et al. | 345/502 |
| 2008/0034318 A1 | 2/2008 | Louch et al. | |
| 2008/0130543 A1 | 6/2008 | Singh et al. | |
| 2008/0155478 A1 | 6/2008 | Stross | |
| 2008/0172626 A1 | 7/2008 | Wu | |

(56) References Cited

U.S. PATENT DOCUMENTS

| | | | |
|---|---|---|---|
| 2008/0297433 | A1 | 12/2008 | Heller et al. |
| 2008/0320321 | A1 | 12/2008 | Sutardja |
| 2009/0021450 | A1 | 1/2009 | Heller et al. |
| 2009/0031329 | A1 | 1/2009 | Kim |
| 2009/0059496 | A1 | 3/2009 | Lee |
| 2009/0160865 | A1* | 6/2009 | Grossman ............... 345/502 |
| 2009/0172450 | A1 | 7/2009 | Wong et al. |
| 2009/0193243 | A1 | 7/2009 | Ely |
| 2010/0010653 | A1 | 1/2010 | Bear et al. |
| 2010/0033433 | A1 | 2/2010 | Utz et al. |
| 2010/0033916 | A1 | 2/2010 | Douglas et al. |
| 2011/0219313 | A1 | 9/2011 | Mazzaferri |

OTHER PUBLICATIONS

Handtops.com, "FlipStart PC in Detail" pp. 1-4, downloaded from the Internet o Sep. 20, 2005 from http://www.handtops.com/show/news/5.

Microsoft Corporation, "Microsoft Windows Hardware Showcase", dated Apr. 28, 2005; pp. 1-5; downloaded from the internet on Sep. 15, 2005, from http://www.microsoft.com/whdc/winhec/hwshowcase05.mspx.

Paul Thurrot's SuperSite for Windows, "WinHEC 2004 Longhom Prototypes Gallery", dated May 10, 2004, pp. 1-4, downloaded from the Internet on Sep. 15, 2005 from http://www.sinwupersite.com/showcase.loghom_winhc_proto.asp.

Vulcan Inc., "Connectivity FAQ", p. 1, downloaded from the internet on Sep. 20, 2005 from http://www.flipstartpc.com/faq_connectivity.asp.

Vulcan, Inc., "Product Features: Size and performanc", p. 1; downloaded from the Internet on Sep. 20, 2005 from http://www.flipstartpc.com/aboutproduct_features_sizeandpower.asp.

"Usage: NVIDIA GeForce 6800—PCIe x16", Dell, archived Jan. 15, 2006 by archive.org, Downloaded Jun. 29, 2011, http://web.archive.org/web/20060115050119/http://support.dell.com/support/edocs/video/P82192/en/usage.htm.

"Graphics: Intel® 82852/82855 Graphics Controller Family", Intel, Archived Nov. 2, 2006 by archive.org, Downloaded Jun. 30, 2011, http://web.archive.org/web/20061103045644/http://www.intel.com/support/graphics/intel852gm/sb/CS-009064.htm?

"Epson: EMP Monitor V4.10 Operation Guide", by Seiko Epson Corp., 2006, http://support.epson.ru/products/manuals/100396/Manual/EMPMonitor.pdf.

"The Java Tutorial: How to Use Combo Boxes", Archived Mar. 5, 2006 by archive.org, Downloaded Jun. 30, 2011, http://web.archive.org/web/20050305000852/http://www-mips.unice.fr/Doc/Java/Tutorial/uiswing/components/combobox.html.

"Epson; EMP Monitor V4, 10 Operation Guide", by Seiko Epson Corp., 2006 http://support.epson.ru/products/manuals/100396/Manual/EMPMonitor.pdf.

"Virtual Network Computing", http://en.wikipedia.org/wiki/Vnc, Downloaded Circa: Dec. 18, 2008, pp. 1-4.

Andrew Fuller; "Auxiliary Display Platform in Longhorn"; Microsoft Corporation; The Microsoft Hardware Engineering Conference Apr. 25-27, 2005; slides 1-29.

McFedries, ebook, titled "Complete Idiot's Guide to Windows XP", published Oct. 3, 2001, pp. 1-7.

PCWorld.com, "Microsoft Pitches Display for Laptop Lids" dated Feb. 10, 2005, pp. 1-2, downloaded from the Internet on Mar. 8, 2006 from http://www.pcworld.com/resources/article/aid/119644.asp.

Vulcan, Inc., "Product Features: Size and performance", p. 1; downloaded from the internet on Sep. 20, 2005 from http://www.flipstartpc.com/aboutproduct_features_sizeandpower.asp.

Vulcan, Inc., "Product Features:LID Module", p. 1, downloaded from the Internet on Sep. 19, 2005 from http://www.flipstartpc.com/aboutproduct_features_lidmodule.asp.

Vulcan, Inc., "Software FAQ", p. 1, downloaded from the internet on Sep. 20, 2005 from http://www.flipstartpc.com/faq_software.asp.

* cited by examiner

System 200

Flowchart 300

System 400

Flowchart 700

HYBRID GRAPHIC DISPLAY

BACKGROUND

1. Field of the Invention

Embodiments of the present invention relate to utilizing multiple graphics subsystems in a computer system.

2. Related Art

Computers often include multiple graphics processing units (GPUs). Often, a computer will supply both an integrated GPU (IGPU) and a discrete GPU (dGPU). Typically, an IGPU is integrated into a portion of a processor chipset, e.g., the north bridge. IGPU's offer a low-cost, low-power video solution. However, many users need a more powerful graphics option, and will use a dGPU to get the functionality they require.

Even for users with high-end graphics requirements, however, it may be advantageous to make use of the IGPU in some scenarios. For example, as the IGPU typically draws much less power than the dGPU, switching to the IGPU for non-graphics intensive work may offer an advantage, in terms of power consumption and/or battery life.

One approach to utilizing both the IGPU and dGPU involves a backend switching mechanism, typically, such as a switching mechanism that allows for selecting whether a display is driven by the IGPU or dGPU. However, this approach involves several issues. Aside from the expense of the actual switching mechanism, the user might experience some disruption in their display, particularly with flat-panel displays, as the low-voltage differential signaling (LVDS) utilized with such displays does not handle such physical switching gracefully.

A second approach involves a making a selection between the frame buffers (and the data contained therein) associated with both the IGPU and dGPU. While this approach eliminates many of the concerns inherent in the previous approach, it introduces several new problems. For example, this approach relies heavily on copying data between frame buffers. This duplication results in performance bottlenecks, e.g., across the PCI-E bus, and also consumes additional bandwidth in the system memory bus.

SUMMARY

In the following embodiments, an approach is described for displaying graphics information from a frame buffer associated with one GPU on a display associated with a second GPU. In some embodiments, scan-out data from one graphics subsystem is transmitted to the raster generator of a second graphics subsystem, for display on a monitor coupled to the second graphics subsystem. These embodiments can be used, for example, to output graphics data rendered by a dGPU to a monitor connected to an IGPU. Further, some embodiments allow a computer system to freely utilize multiple displays, without regard to which display is connected to which graphics processor.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
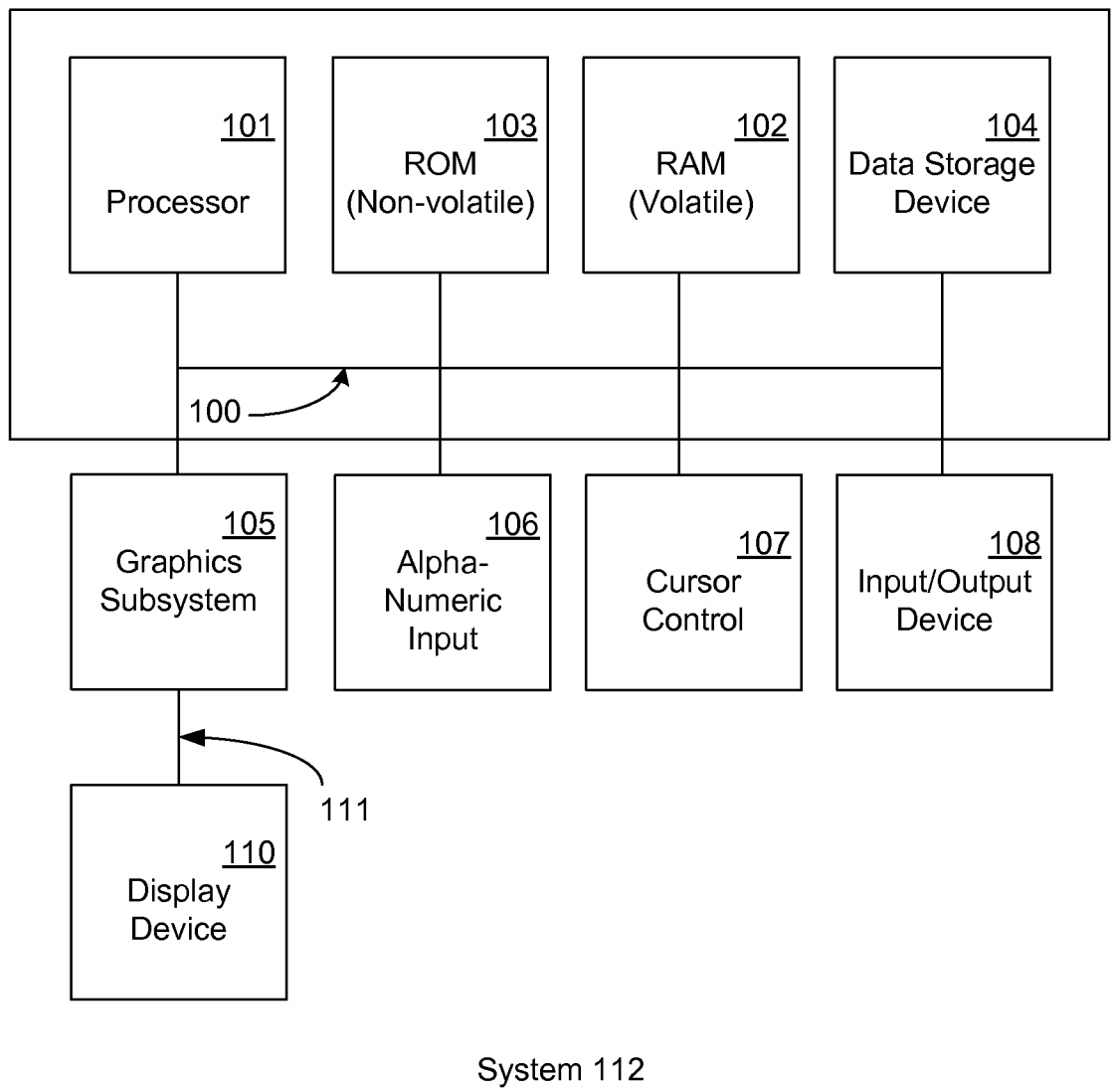
FIG. 1 is a block diagram of an exemplary computer system upon which embodiments of the present invention may be implemented.

Reference will now be made in detail to several embodiments of the invention. While the invention will be described in conjunction with the alternative embodiment(s), it will be understood that they are not intended to limit the invention to these embodiments. On the contrary, the invention is intended to cover alternative, modifications, and equivalents, which may be included within the spirit and scope of the invention as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in figures herein (e.g., FIG. 3) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Although embodiments described herein may make reference to a CPU and a GPU as discrete components of a computer system, those skilled in the art will recognize that a CPU and a GPU can be integrated into a single device, and a CPU and GPU may share various resources such as instruction logic, buffers, functional units and so on; or separate resources may be provided for graphics and general-purpose operations. Accordingly, any or all of the circuits and/or functionality described herein as being associated with GPU could also be implemented in and performed by a suitably configured CPU.

Further, while embodiments described herein may make reference to a GPU, it is to be understood that the circuits and/or functionality described herein could also be implemented in other types of processors, such as general-purpose or other special-purpose coprocessors, or within a CPU.

Basic Computing System

Referring now to FIG. 1, a block diagram of an exemplary computer system 112 is shown. It is appreciated that computer system 112 described herein illustrates an exemplary configuration of an operational platform upon which embodiments may be implemented to advantage. Nevertheless, other computer systems with differing configurations can also be used in place of computer system 112 within the scope of the present invention. That is, computer system 112 can include elements other than those described in conjunction with FIG. 1. Moreover, embodiments may be practiced on any system which can be configured to enable it, not just computer systems like computer system 112. It is understood that embodiments can be practiced on many different types of computer system 112. System 112 can be implemented as, for example, a desktop computer system or server computer system having a powerful general-purpose CPU coupled to a dedicated graphics rendering GPU. In such an embodiment, components can be included that add peripheral buses, specialized audio/video components, IO devices, and the like. Similarly, system 112 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan. System 112 can also be implemented as a "system on a chip", where the electronics (e.g., the components 101, 103, 105, 106, and the like) of a computing device are wholly contained within a single integrated circuit die. Examples include a hand-held instrument with a display, a car navigation system, a portable entertainment system, and the like.

Computer system 112 comprises an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Moreover, computer system 112 also comprises a data storage device 104 (e.g., hard disk drive) for storing information and instructions.

Computer system 112 also comprises an optional graphics subsystem 105, an optional alphanumeric input device 106, an optional cursor control or directing device 107, and signal communication interface (input/output device) 108. Optional alphanumeric input device 106 can communicate information and command selections to central processor 101. Optional cursor control or directing device 107 is coupled to bus 100 for communicating user input information and command selections to central processor 101. Signal communication interface (input/output device) 108, which is also coupled to bus 100, can be a serial port. Communication interface 108 may also include wireless communication mechanisms. Using communication interface 108, computer system 112 can be communicatively coupled to other computer systems over a communication network such as the Internet or an intranet (e.g., a local area network), or can receive data (e.g., a digital television signal). Computer system 112 may also comprise graphics subsystem 105 for presenting information to the computer user, e.g., by displaying information on an attached display device 110, connected by a video cable 111. In some embodiments, graphics subsystem 105 is incorporated into central processor 101. In other embodiments, graphics subsystem 105 is a separate, discrete component. In other embodiments, graphics subsystem 105 is incorporated into another component. In other embodiments, graphics subsystem 105 is included in system 112 in other ways.

Hybrid Graphics

In the following embodiments, an approach is described for displaying graphics information from a frame buffer associated with one GPU on a display associated with a second GPU. In some embodiments, scan-out data from one graphics subsystem is transmitted to the raster generator of a second graphics subsystem, for display on a monitor coupled to the second graphics subsystem. These embodiments can be used, for example, to output graphics data rendered by a dGPU to a monitor connected to an IGPU. Further, some embodiments allow a computer system to freely utilize multiple displays, without regard to which display is connected to which graphics processor.

In the description that follows, the term "monitor" is understood to represent any type of graphics display unit which might be utilized in a computer system. For example, a cathode rate tube (CRT) a monitor, a thin-film transistor (TFT) monitor, a liquid crystal display (LCD), a plasma flat-panel display, or any sort of projector-based display are included in use of the term monitor. Such monitors may be incorporated any computing system, e.g., as is the case in a laptop computer, a personal digital assistant (PDA), a mobile phone, or a smart phone. Such monitors may also be separate units, as is often the case with a desktop computer. In some embodiments, combinations of monitors of various types may be utilized. The term monitor is utilized exclusively herein to prevent potential confusion through overuse of the term "display."

Hybrid Display in a Single Monitor System

Figure 2:
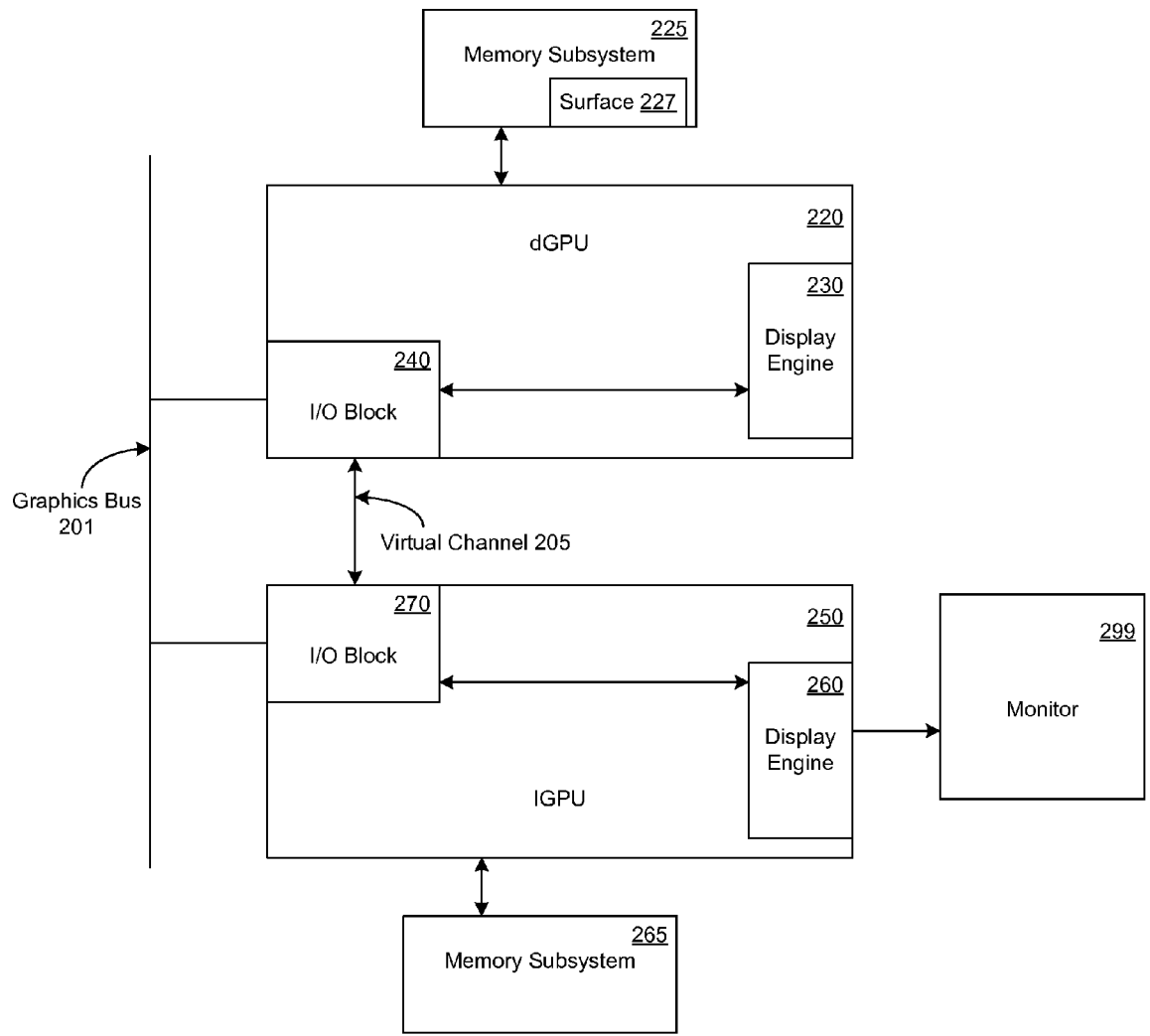
FIG. 2 is a block diagram of a single monitor system, in accordance with one embodiment of the present invention.

With reference now to FIG. 2, a block diagram of a single monitor system 200 is depicted, in accordance with one embodiment. While FIG. 2 depicts specific, enumerated elements, features, and arrangements, it is understood that embodiments are well suited to applications involving different elements, features, or arrangements.

System 200 is depicted as incorporating both a discrete graphics processing unit (dGPU) 220 and an integrated graphics processing unit (IGPU) 250. A single monitor, monitor 299, is shown as being coupled to IGPU 250. IGPU 250 and dGPU 220 are shown as being coupled to graphics bus 201; in some embodiments, the IGPU may be connected to a different bus than the dGPU.

DGPU 220 incorporates display engine 230 and I/O block 240, and is associated with memory subsystem 225, which is shown here as containing surface 227. IGPU 250 incorporates display engine 260 and I/O block 270, and is associated with memory subsystem 265. In this embodiment, an I/O block is used for transmitting data and instructions to and from a GPU, while the display engine is utilized to generate scan-out data for display on a monitor. A memory subsystem may be dedicated memory, e.g., a frame buffer for a dGPU, or may be allocated portion of system memory, e.g., as is common for many IGPUs.

In order to display graphics information, such as surface 227, from dGPU 220 on monitor 299, data is passed from dGPU 220 to IGPU 250. In some embodiments, as explained in greater detail below, dGPU 220 performs some or all of the necessary rendering operations on surface 227, before the resulting scan-out data is transmitted to IGPU 250 via virtual channel 205. Virtual channels, and several different approaches for implementing them, are also discussed in greater detail below. Once IGPU 250 receives the scan-out data from dGPU 220, display engine 260 is used to display the scan-out data on monitor 299.

Method of Displaying Graphics Data

Figure 3:
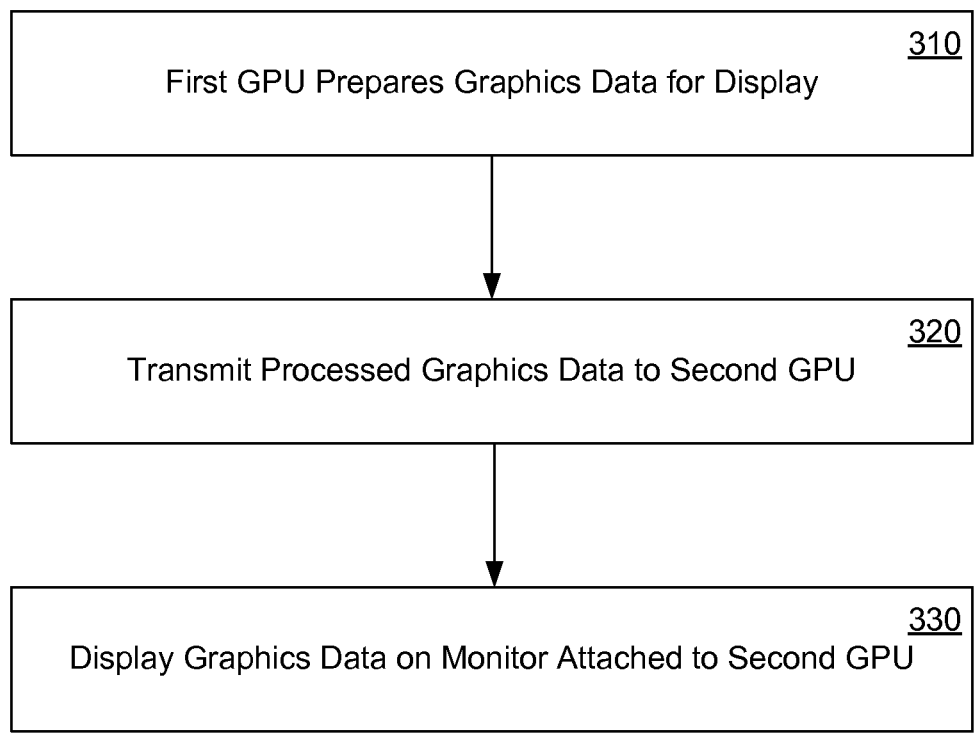
FIG. 3 is a flowchart of a method of displaying graphics data, in accordance with one embodiment of the present invention.

With reference now to FIG. 3, a flowchart 300 of a method of displaying graphics data is depicted, in accordance with one embodiment. Although specific steps are disclosed in flowchart 300, such steps are exemplary. That is, embodiments of the present invention are well suited to performing various other (additional) steps or variations of the steps recited in flowchart 300. It is appreciated that the steps in flowchart 300 may be performed in an order different than presented, and that not all of the steps in flowchart 300 may be performed.

Flowchart 300 depicts a method of displaying graphics data from one graphics subsystem on a monitor connected to a second graphics subsystem. With reference to step 310, graphics data is prepared for display by the first graphics subsystem. In some embodiments, graphics data, such as a surface, is partially or completely processed by a dGPU associated with the first graphics subsystem. Such embodiments allow, for example, a more capable GPU to perform the necessary operations on the graphics data.

For example, dGPU 220 retrieves surface 227 from memory subsystem 225. DGPU 220, and specifically display engine 230, processes surface 227, and produces scan-out data.

With reference now to step 320, the processed graphics data is transmitted to the second graphics subsystem. In some embodiments, the prepared graphics data, such as scan-out data, is transmitted to the second graphics subsystem. This transmission may be initiated, for example, by an I/O block of the first graphics subsystem. The data may be transmitted via a wide variety of connections. For example, a dedicated physical connection may be utilized; alternatively, an existing connection between the two graphics subsystems may be utilized to transmit the graphics data.

Continuing the preceding example, dGPU 220, and specifically I/O block 240, transmits the scan-out data to IGPU 250 via virtual channel 205.

With reference now to step 330, the processed graphics data is displayed on a monitor coupled to the second graphics subsystem.

Continuing the preceding example, IGPU 250, and specifically I/O block 270, receives the scan-out data. Display engine 260 is used to display the scan-out data on monitor 299.

Embodiments utilizing the above described method offers several advantages. First, either of several GPUs can drive the same monitor, without the need for back-end switching. Second, the contents of the memory subsystem associated with the source GPU are not copied across to the memory subsystem associated with the destination GPU, which removes several potential system bottlenecks. Additionally, the appropriate GPU for a given task may be utilized. For example, the graphics data for a graphics-intensive task, such as a video game, can be handled by the dGPU, while the graphics data for a less-intensive task, such as word processing, can be handled by the IGPU. The ability to allocate graphics processing power is beneficial in terms of power consumption. Other advantages and applications are described herein, or may become apparent to one having skill in the art.

Display Engine

Figure 4:
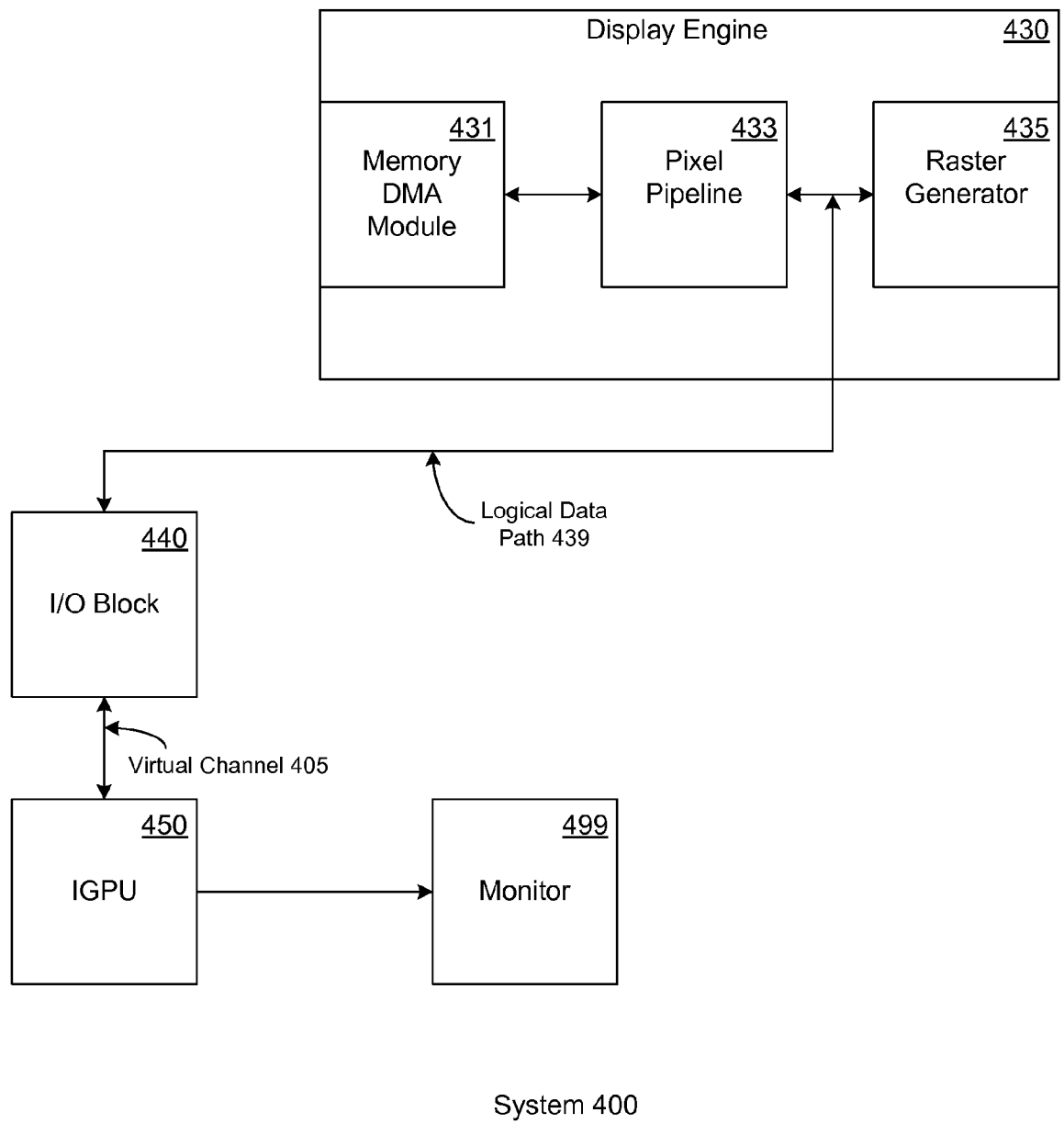
FIG. 4 is a block diagram of an exemplary system, in accordance with one embodiment of the present invention.

With reference now to FIG. 4, a block diagram of an exemplary system 400 is depicted, in accordance with one embodiment. While system 400 is depicted as including specific, enumerated features, elements, and arrangements, it is understood that embodiments are well suited to applications involving additional, fewer, or different elements, features, or arrangements.

FIG. 4 provides an expanded view of exemplary display engine 430. Display engine 430 is depicted as including memory direct memory access (DMA) module 431. DMA module 431 is used by display engine 430 to interface with an associated memory subsystem, e.g., such as memory subsystem 225. Display engine 430 is also shown as including pixel pipeline 433. Pixel pipeline 433 is used to manipulate graphics data retrieved by DMA module 431, to produce scan-out data for display. The functionality of pixel pipeline 433 may vary, across different embodiments. Display engine 430 also includes raster generator 435. Raster generator 435 is used by display engine 430 to output scan-out data to an attached monitor.

In the depicted embodiment, a logical data path has been added in order to divert scan-out data from display engine 430, as indicated by arrow 439. The scan-out data, rather than passing to raster generator 435, is passed to I/O block 440. The scan-out data can then be transmitted, e.g., via virtual channel 405, to a second GPU, e.g., IGPU 450. This second GPU can then display the scan-out data upon an attached monitor, e.g., monitor 499.

In this way, the depicted embodiment allows graphics data to be processed by one GPU, and displayed upon a monitor connected to a second GPU. This offers several advantages. For example, a more capable GPU, e.g., a dGPU, can be used to process graphics-intensive information, and output the resulting scan-out data to a monitor connected to a less capable GPU, e.g., an IGPU. Further, dissociating the processing of graphics data from the display of the resulting scan-out data allows for a system with multiple independent monitors, such that any given monitor may display any given information, without regard to which GPU in particular monitor is connected to.

In some embodiments, data may be diverted from the display engine at a different point in processing. For example, in one embodiment, the graphics data is diverted from display engine 430 after retrieval by DMA module 431, but before processing by pixel pipeline 433. In such an embodiment, the unprocessed graphics data is diverted to I/O block 440, and passed to IGPU 450 via virtual channel 405. Such an embodiment may, for example, allow raw graphics data to be passed from a less capable GPU to a more capable GPU for processing. In other embodiments, data is diverted from the first graphics subsystem to the second graphics subsystem at other points during processing. While the term "scan-out data" is used throughout this description, it is understood that embodiments are well suited to applications in which graphics data is transmitted between graphics subsystems, irrespective of the current processing and/or format of the graphics data.

I/O Block

Figure 5:
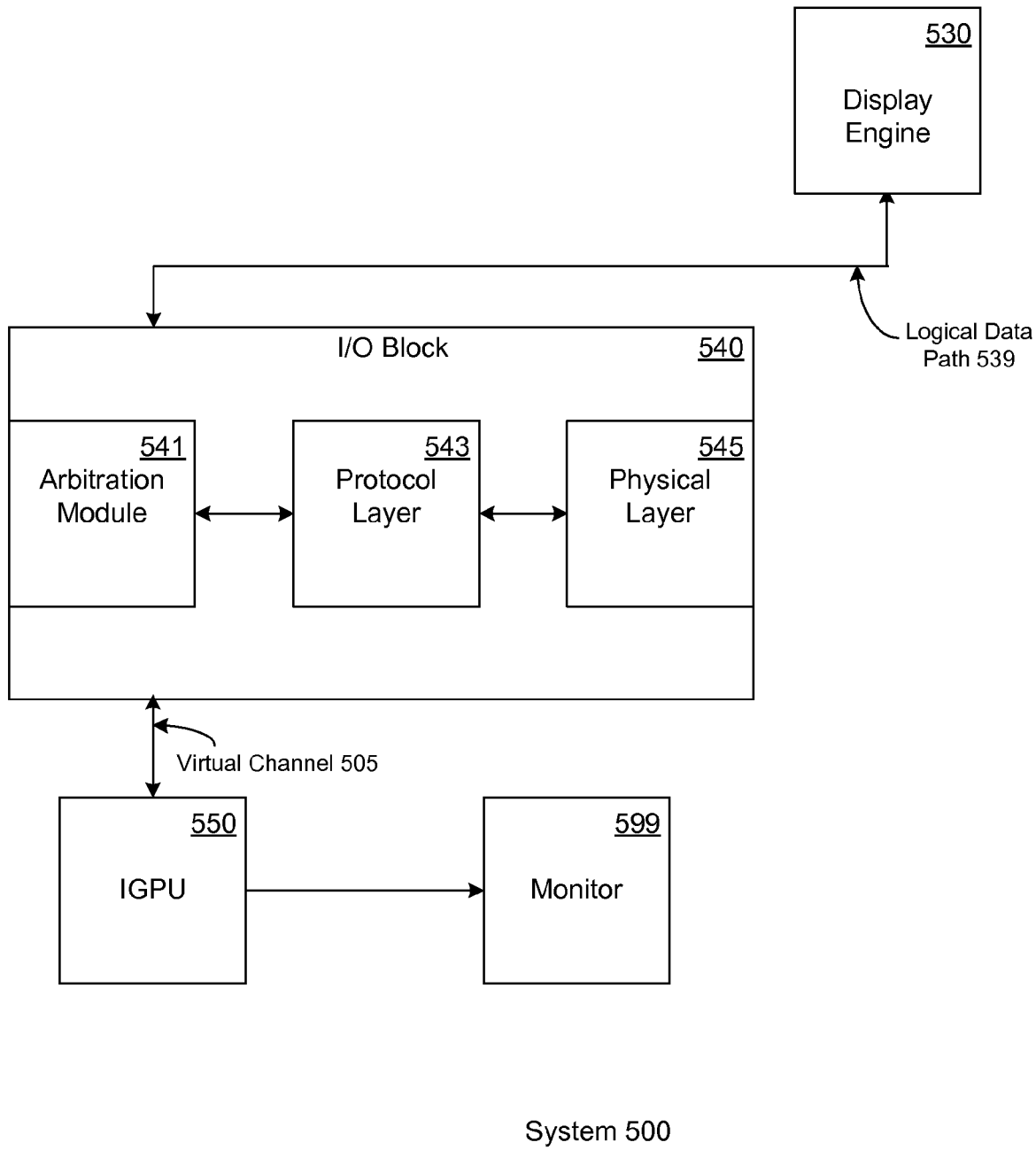
FIG. 5 is a block diagram of an exemplary system, in accordance with one embodiment of the present invention.

With reference now to FIG. 5, a block diagram of an exemplary system 500 is depicted, in accordance with one embodiment. While system 500 is depicted as including specific, enumerated features, elements, and arrangements, it is understood that embodiments are well suited to applications involving additional, fewer, or different elements, features, or arrangements.

FIG. 5 depicts an expanded representation of exemplary I/O block 540. I/O block 540 is depicted as including arbitration module 541. Arbitration module 541 is used by I/O block 540 to determine the order and priority of input and output actions to be performed. I/O block 540 is also shown as including protocol layer 543. Protocol layer 543 is used by I/O block 540 to convert data into an appropriate protocol for its intended destination. I/O block 540 also includes physical layer 545. Physical layer 545 is used by I/O block 540 to interface with the available physical connections, e.g., a connection to a video bus.

In the depicted embodiment, scan-out data is received from display engine 530 via a logical data path 539. This scan-out data is forwarded by I/O block 540 to IGPU 550, via virtual channel 505. IGPU 550 can then display the scan-out data on monitor 599. In different embodiments, virtual channel 505 may be implemented in different ways. In some embodiments, depending upon the implementation of virtual channel 505, one or more of the components of I/O block 540 may be utilized to implement an appropriate forwarding technique. Embodiments involving different implementations of virtual channel 505 are discussed in greater detail, below.

Passing Data Between Graphics Subsystems

As noted previously, in different embodiments different approaches may be utilized for passing data between graphics subsystems. The term "virtual channel" has been used herein as a broad term, meant to encompass the various approaches suitable for such data transactions. Several specific examples of such approaches are described below; these examples are intended to the illustrative, but not exhaustive.

One option for transferring data between two graphics subsystems is to use a dedicated connection. This dedicated connection might use an existing graphics protocol, e.g., Display Port, or a purpose built connection. A dedicated connection offers several advantages, in that the protocol for transmitting the data may not be dictated by the constraints of the connection. Instead, a connection could be implemented specifically to provide for suitable data transmissions. Moreover, a dedicated connection between graphics subsystems would reduce or eliminate bandwidth concerns, such as those which may arise in a shared connection scenario. In some embodiments, implementing a dedicated connection between two graphics subsystems, particularly between a dGPU and an IGPU, may require additional hardware modifications. In some embodiments, this approach may call for modifications to the I/O block of a GPU, to allow for data transmission and reception via a dedicated connection.

Another option for transferring data between two graphics subsystems is to co-opt or otherwise dedicate some portion of an existing connection, to create a direct link. For example, the PCI-E bus commonly used in modern graphics applications offers 16 communications "lanes." Some portion of these lanes may be utilized solely for passing data between graphics subsystems. This direct link approach makes use of the existing physical connection, but may not rely upon the traditional corresponding protocol. In some embodiments, this approach may call for modifications to the physical layer of the I/O block of a GPU, in order to divert specified traffic to the appropriate portions of the existing connection.

A further option for transferring data between graphics subsystems is to utilize an existing connection between the graphics subsystems. In some embodiments, scan-out data can be packetized and directed to the appropriate graphics subsystem, via an existing connection between the subsystems. For example, packets of scan-out data may be transmitted between a dGPU and an IGPU via the PCI-E bus. In several such embodiments, a modification is made to the arbitration module of the I/O block, in order to allow for deterministic timing of pixel data.

A further option for transferring data between graphics subsystems is to utilize the existing connection between the graphics subsystems to transmit specialized data. For example, the PCI-E protocol that co meets the dGPU to the chip containing the iGPU allows for vendor defined messages (VDM) to be passed via the corresponding connection. The scan-out data can be encapsulated in these VDM packets, and transmitted from one graphics subsystem to another. In some embodiments, a modification is made to the protocol module of the I/O block, in order to allow scan-out data to be appropriately encapsulated. In different embodiments, similar approaches may be utilized, depending upon the architecture and/or protocols involved.

In other embodiments, other approaches are utilized for transmitting data between graphics subsystems.

Scan-Out Data Processing

Figure 6:
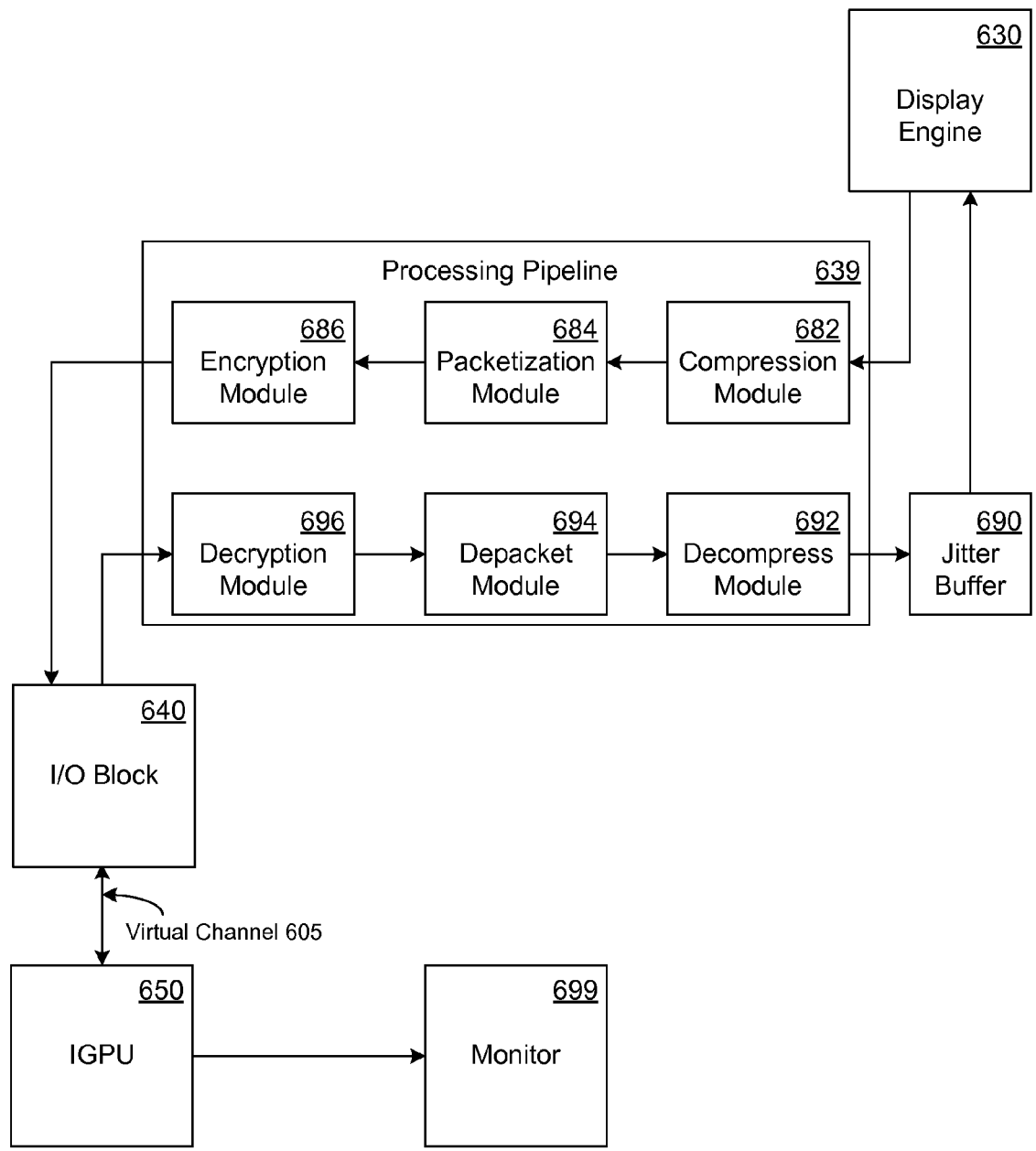
FIG. 6 is a block diagram of an exemplary system, in accordance with one embodiment of the present invention.

With reference now to FIG. 6, a block diagram of an exemplary system 600 is depicted, in accordance with one embodiment. While system 600 is depicted as including specific, enumerated features, elements, and arrangements, it is understood that embodiments are well suited to applications involving additional, fewer, or different elements, features, or arrangements.

In some embodiments, graphics data is subjected to some processing before transmission between one graphics subsystem and another. In different embodiments, the exact processing performed may vary. FIG. 6 depicts an exemplary embodiment, in which graphics data is compressed, packetized, and encrypted before transmission. In other embodiments, a different ordering of procedures may be utilized, or some processing procedures may be omitted or added.

System 600 is depicted as including GPU 620. GPU 620, in turn, is shown as incorporating display engine 630 and I/O block 640, which are interconnected by processing pipeline 639.

In the depicted embodiment, processing pipeline 639 allows data to flow between display engine 630 and I/O block 640, in either direction. In this embodiment, GPU 620 can transmit graphics data to a second GPU, or receive graphics data from another GPU for display.

When GPU 620 is transmitting graphics data to another graphics subsystem, graphics data, such as scan-out data, passes from display engine 632 compression module 682. Compression module 682 is used to reduce the overall amount of data to be transmitted. In different embodiments, different compression techniques may be utilized; for example, run length coding (RLC) may be used to compress the scan-out data received from display engine 630. Such compression techniques may be lossless or lossy.

In the depicted embodiment, compressed graphics data is passed to packetization module 684. In some embodiments, it is advantageous to use packet-based transmission techniques to transmit graphics data between the two graphics subsystems. One advantage of packetization is that graphics data packets can be interleaved in the connection between the graphics subsystems. As such, graphics packets can be transmitted via an existing connection. Similarly, packets corresponding to multiple surfaces may be transmitted simultaneously, which is especially useful in a multi-monitor scenario.

In the depicted embodiment, the packets of compressed graphics data pass through encryption module 686. In some embodiments, is necessary to encrypt data before it leaves GPU 620. For example, in order to comply with certain digital rights management (DRM) licensing schemes, graphics data is encrypted before it leaves GPU 620. Different embodiments are well-suited to applications involving different types of encryption. For example, an implementation of high-bandwidth digital content protection (HDCP) can be utilized, or a key-exchange encryption technique incorporated into encryption module 686. The encrypted packets of compressed graphics data are then passed to I/O block 640, and forwarded to a second graphics subsystem.

When GPU 620 is receiving graphics data from another graphics subsystem, the received data is passed from I/O block 640 to processing pipeline 639. When receiving graphics data from another graphics subsystem, the processing performed on the graphics data should be reversed. For example, with reference to FIG. 6, received graphics data is first decrypted body decryption module 696, reassembled from its packetized form by depacketization module 694, and decompressed by decompression module 692.

Further, in some embodiments, a jitter buffer 690 is included in GPU 620. In these embodiments, jitter buffer 690 is used to temporarily store received graphics data until display engine 620 calls for it. By buffering graphics data in this manner, any timing inconsistencies introduced by the virtual channel between graphics subsystems can be mitigated.

Method of Transmitting Graphics Data

Figure 7:
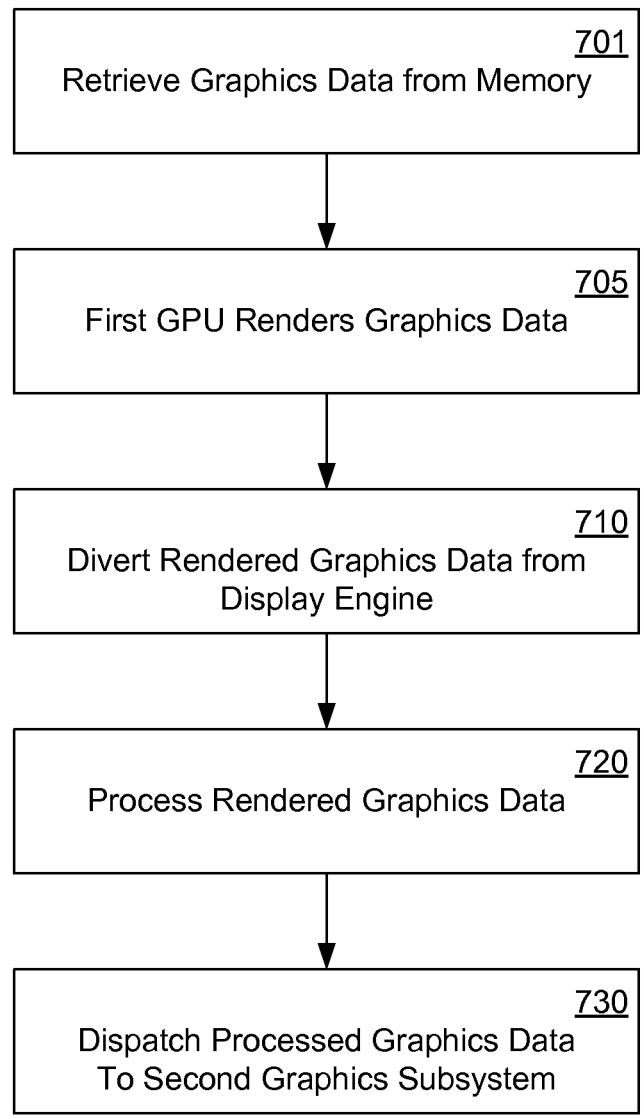
FIG. 7 is a flowchart of a method of transmitting graphics data, in accordance with one embodiment of the present invention.

With reference now to FIG. 7, a flowchart 700 of a method of transmitting graphics data is depicted, in accordance with one embodiment. Although specific steps are disclosed in flowchart 700, such steps are exemplary. That is, embodiments of the present invention are well suited to performing various other (additional) steps or variations of the steps recited in flowchart 700. It is appreciated that the steps in flowchart 700 may be performed in an order different than presented, and that not all of the steps in flowchart 700 may be performed.

With reference now to step 701, in some embodiments, graphics data is retrieved from a memory subsystem associated with a graphics subsystem. For example, pixel data corresponding to a surface is retrieved from a frame buffer associated with a dGPU. In one embodiment, memory subsystem interactions may be performed by a DMA module of a display engine of the graphics subsystem.

For example, display engine 230 retrieves graphics data corresponding to surface 227 from memory subsystem 225.

With reference now to step 705, the graphics data is rendered by the graphics subsystem, in preparation for display. In some embodiments, graphics data is manipulated by the graphics subsystem before it is transmitted to a destination graphics subsystem. For example, a pixel pipeline in the display engine of the dGPU is used to perform a blending operation on the graphics data, and produces scan-out data. In other embodiments, graphics data is not processed by the graphics subsystem before transmission.

For example, graphics data retrieved by memory DMA module 431 is rendered by pixel pipeline 433.

With reference now to step 710, rendered graphics data is diverted from the display engine of the graphics subsystem. For example, scan-out data is diverted after processing by the pixel pipeline of the display engine. In other embodiments, the processed graphics data may be diverted at a different point in the graphics pipeline.

For example, scan-out data is diverted after processing by pixel pipeline 433, and is passed out of display engine 430 via logical data path 439.

With reference now to step 720, the diverted graphics data is processed before transmission. In different embodiments, different techniques may be utilized in processing the diverted graphics data, in preparation for transmission to a second graphics subsystem. For example, the diverted graphics data may be compressed, encrypted, and/or packetized before it is transmitted.

For example, scan-out data passes through processing pipeline 639. This scan-out data is compressed by compression module 682, packetized by packetization module 600 84, and encrypted byte encryption module 686.

With reference now to step 730, the processed graphics data is dispatched to a second graphics subsystem. In some embodiments, a virtual channel is used that the first graphics subsystem with a second graphics subsystem. As discussed previously, this virtual channel may take a variety of forms, in different embodiments. Depending upon the nature of the connection between the two graphics subsystems, different embodiments utilize different techniques within an I/O block of the first graphics subsystem. For example, if vendor defined messages (VDM) are used to pass packets of graphics data between the graphics subsystems, a modification in the protocol layer of the I/O block may be utilized, in order to encapsulate the packets of graphics data accordingly.

For example, packets of graphics data passes through I/O block 540, and are transmitted via virtual channel 505 to IGPU 550.

Method of Receiving Graphics Data

Figure 8:
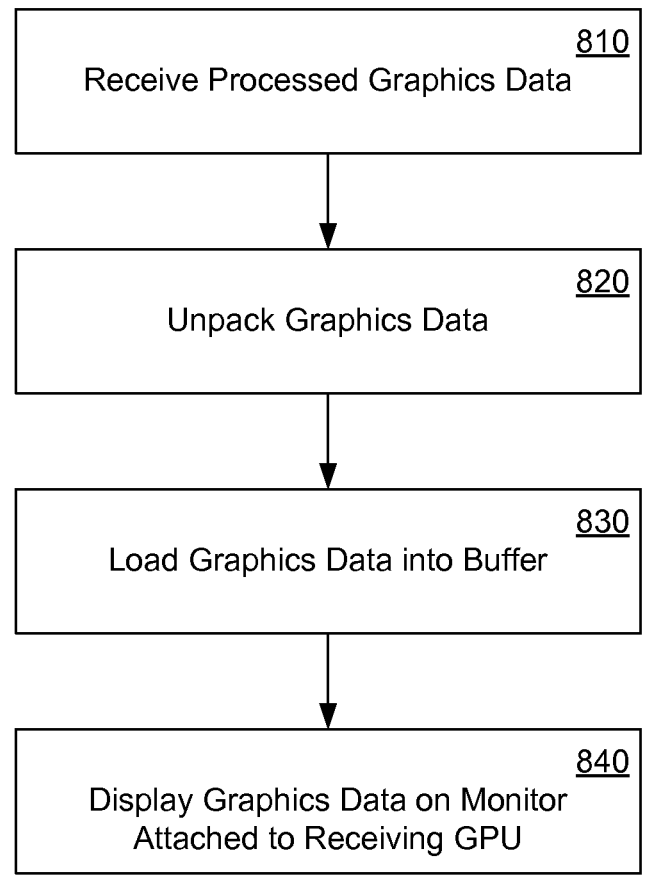
FIG. 8 is a flowchart of a method of receiving graphics data, in accordance with one embodiment of the present invention.

With reference now to FIG. 8, a flowchart 800 of a method of receiving graphics data is depicted, in accordance with one embodiment. Although specific steps are disclosed in flowchart 800, such steps are exemplary. That is, embodiments of the present invention are well suited to performing various other (additional) steps or variations of the steps recited in flowchart 800. It is appreciated that the steps in flowchart 800 may be performed in an order different than presented, and that not all of the steps in flowchart 800 may be performed.

With reference now to step 810, processed graphics data is received. In some embodiments, processed graphics data is transmitted between two graphics subsystems via a virtual channel or connection. The processed graphics data is transmitted by the I/O block of the first graphics subsystem, and received into the I/O block of the second graphics subsystem.

For example, processed graphics data is transmitted by I/O block 240 of dGPU 220 via virtual channel 205, and is received by I/O block 270 of IGPU 250.

With reference now to step 820, the received processed graphics data is unpacked. In some embodiments, the processing performed by the transmitting graphics subsystem is reversed, to restore the original graphics data. For example, graphics data may need to be decrypted, depacketized or similarly reassembled, and decompressed. In some embodiments, e.g., where a lossy compression technique was utilized by the transmitting graphics subsystem, the unpacked graphics data may not exactly match the graphics data provided by the transmitting graphics subsystem.

For example, and encrypted packets of compressed graphics data are received by I/O block 640, where they are decrypted by decryption module 696, reassembled from the packetized state by depacketization module 694, and decompressed by decompression module 692.

With reference now to step 830, the restored graphics data is loaded into a buffer. In some embodiments, graphics data is buffered after it has been unpacked. One such embodiment allows for corrections of timing errors introduced by the virtual channel, for example. A graphics data can be stored in this jitter buffer until the display engine of the receiving graphics subsystem is ready to display information. In some embodiments, a jitter buffer can be implemented as a FIFO, a type of "first in, first out" memory.

For example, the unpacked scan-out data is loaded into jitter buffer 690.

With reference now to step 840, the restored graphics data is output to a monitor by AP receiving graphics subsystem's display engine. In some embodiments, the display engine of the receiving graphics subsystem, and specifically the raster generator of the display engine, draws graphics data from the jitter buffer and outputs it to an attached monitor.

For example, display engine 260 outputs the scan-out data received from dGPU 220 to monitor 299.

Embodiments of the present invention are thus described. While the present invention has been described in particular embodiments, it should be appreciated that the present invention should not be construed as limited by such embodiments, but rather construed according to the following claims.

What is claimed is:

1. A method of displaying graphics data, said method comprising:
   accessing said graphics data in a memory subsystem associated with a first graphics subsystem;
   rendering said graphics data with said first graphics subsystem to produce rendered graphics data operable to be displayed by said first graphics subsystem;
   transmitting said rendered graphics data from said first graphics subsystem to a second graphics subsystem, wherein said rendered graphics data is transmitted to a raster generator of said second graphics subsystem; and
   displaying said rendered graphics data on a monitor coupled to said second graphics subsystem, wherein said second graphics subsystem is operable to display said graphic data in response to receiving said rendered graphics data.

2. The method of claim 1, further comprising:
   performing a rendering operation on said graphics data in said first graphics subsystem.

3. The method of claim 2, wherein said rendering operation is performed by a display engine associated with said first graphics subsystem.

4. The method of claim 1, wherein said graphics data is transmitted over a virtual channel between said first graphics subsystem and said second graphics subsystem.

5. The method of claim 4, wherein said virtual channel comprises a dedicated physical connection between said first graphics subsystem and said second graphics subsystem.

6. The method of claim 5, wherein said dedicated physical connection comprises a connection in accordance with a Display Port protocol.

7. The method of claim 4, wherein said virtual channel comprises a portion of an existing connection between said first graphics subsystem and said second graphics subsystem allocated for use as said virtual channel.

8. The method of claim 7, wherein said existing connection comprises a connection in accordance with a peripheral component interconnect express (PCI-E) protocol.

9. The method of claim 4, wherein said virtual channel comprises transmitting said graphics data as packets of vendor defined message (VDM) data.

10. A system for transmitting graphics data from a first graphics subsystem to a second graphics subsystem, said system comprising:
    a memory subsystem, associated with said first graphics subsystem, for storing and said graphics data;
    a display engine, coupled to said memory subsystem, for retrieving said graphics data;
    a pixel pipeline operable for performing a rendering operation on said graphics data to produce rendered graphics data, wherein said rendered graphics data is operable to be displayed by said first graphics subsystem; and
    an input/output (I/O) block, coupled to said display engine, for transmitting said graphics data to said second graphics subsystem, wherein said second graphics subsystem is operable to display said graphic data in response to receiving said graphics data, and wherein said rendered graphics data is transmitted to a raster generator of said second graphics subsystem.

11. The system of claim 10, wherein said memory subsystem comprises a frame buffer.

12. The system of claim 10, wherein said display engine comprises:

a direct memory access (DMA) module, for retrieving said graphics data from said memory subsystem, wherein said pixel pipeline is coupled to said DMA module; and a raster generator, coupled to said pixel pipeline, for outputting said graphics data to an attached monitor.

13. The system of claim 12, further comprising a logical data path for passing said graphics data from said pixel pipeline to said I/O block.

14. The system of claim 12, further comprising a logical data path for passing said graphics data from said DMA module to said I/O block.

15. The system of claim 12, further comprising a logical data path for passing said graphics data from said raster generator to said I/O block.

16. The system of claim 12, further comprising:

a processing pipeline, for preparing said graphics data for transmission from said first graphics subsystem to said second graphics subsystem.

17. A method of displaying graphics data, said method comprising:

receiving packed graphics data from a first graphics subsystem into a second graphics subsystem, wherein said graphics data is operable for display by said first graphics subsystem;

unpacking said packed graphics data into said graphics data; and outputting said graphics data to a monitor coupled to said second graphics subsystem, wherein said second graphics subsystem is operable to display said graphic data in response to receiving said graphics data, wherein said rendered graphics data is output by a raster generator of said second graphics subsystem.

18. The method of claim 16, wherein said packed graphics data is received via a virtual channel connection between said first graphics subsystem and said second graphics subsystem.

19. The method of claim 16, wherein said unpacking comprises decompressing said graphics data.

20. The method of claim 16, further comprising:

storing said graphics data in a buffer until it is needed for display.

* * * * *